US010421537B2

(12) United States Patent
Wolcott et al.

(10) Patent No.: US 10,421,537 B2
(45) Date of Patent: Sep. 24, 2019

(54) LOCKING MECHANISMS FOR TAIL ROTOR DRIVE DISCONNECT COUPLINGS

(71) Applicant: Sikorsky Aircraft Corporation, Stratford, CT (US)

(72) Inventors: William Wolcott, Milford, CT (US); Michael F. Mullen, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 568 days.

(21) Appl. No.: 15/203,615

(22) Filed: Jul. 6, 2016

(65) Prior Publication Data
US 2018/0009524 A1    Jan. 11, 2018

(51) Int. Cl.
| | |
|---|---|
| *B64C 1/30* | (2006.01) |
| *F16D 11/14* | (2006.01) |
| *B64C 27/14* | (2006.01) |
| *B64C 27/82* | (2006.01) |
| *F16D 1/076* | (2006.01) |
| *F16D 1/10* | (2006.01) |
| *F16D 1/116* | (2006.01) |
| *B64C 27/04* | (2006.01) |

(52) U.S. Cl.
CPC ............... *B64C 27/14* (2013.01); *B64C 1/30* (2013.01); *B64C 27/04* (2013.01); *B64C 27/82* (2013.01); *F16D 1/076* (2013.01); *F16D 1/10* (2013.01); *F16D 1/116* (2013.01); *F16D 11/14* (2013.01)

(58) Field of Classification Search
CPC ........... F16D 11/14; F16D 1/076; B64C 27/14
See application file for complete search history.

(56) References Cited

U.S. PATENT DOCUMENTS

| | | | | | |
|---|---|---|---|---|---|
| 2,855,768 | A | * | 10/1958 | Plano ...................... | F16D 11/10 192/69.2 |
| 3,184,258 | A | * | 5/1965 | Kapusta ............. | B60K 17/3515 192/108 |
| 3,351,364 | A | * | 11/1967 | Warn ...................... | F16D 11/14 192/69.43 |
| 3,981,158 | A | * | 9/1976 | Watson ................... | B64C 27/82 464/98 |
| 4,026,397 | A | * | 5/1977 | Raus ....................... | F16D 11/14 192/114 R |
| 4,365,696 | A | * | 12/1982 | Telford ............... | B60B 27/0026 192/112 |
| 4,854,434 | A | * | 8/1989 | Kurihara ............ | B60K 17/3515 192/35 |
| 4,932,809 | A | * | 6/1990 | Kopp ........................ | F16D 3/02 403/1 |
| 5,360,376 | A | * | 11/1994 | Baldino .................. | F16D 11/10 464/154 |

(Continued)

*Primary Examiner* — Brian M O'Hara
(74) *Attorney, Agent, or Firm* — Cantor Colburn LLP (57) ABSTRACT

A locking mechanism for a driveshaft disconnect coupling includes an input jaw member defining a rotation axis, an output jaw member connectable to the input jaw member for common rotation with the input jaw member, and a cartridge assembly. The cartridge assembly is fixed to the input jaw member, includes a pin, and defines a pin movement axis. The pin is movable along the pin axis between a radially inner position and a radially outer position, the pin being disengaged from the output jaw member in the radially inner position and the pin being engaged to the output jaw member in the radially outer position.

20 Claims, 4 Drawing Sheets

(56) References Cited

U.S. PATENT DOCUMENTS 5,672,112 A      9/1997   Sbabo
7,631,737 B2 *  12/2009   Louis .................... F16D 11/10
                                                    192/20
8,074,777 B2 *  12/2011   Birdi .................... F16D 11/04
                                                    192/101

* cited by examiner

LOCKING MECHANISMS FOR TAIL ROTOR DRIVE DISCONNECT COUPLINGS

BACKGROUND OF THE INVENTION

1. Field of the Invention

The present disclosure relates to rotorcraft power transmission systems, and more particularly to disconnect couplings for rotorcraft transmission drive shafts.

2. Description of Related Art

Rotorcraft like helicopters commonly employ a tail rotor, which is usually supported at the aft end of a longitudinally extending tail cone, to oppose torque exerted by the main rotor system. The tail rotor is typically driven from a drive shaft which extends from a main gearbox carried within the rotorcraft fuselage, and is supported by bearings arranged along the tail cone.

In rotorcraft designed for operation from the deck of a ship, it can be desirable to reduce the size of the rotorcraft footprint, simplifying storage and handling. One approach to reducing rotorcraft footprint is by incorporating a hinge between the fuselage and the tail cone to enable folding of the tail rotor from its extended operational position to a stowed position adjacent the forward part of the tail cone to facilitate rotorcraft storage in confined spaces found in marine vessels and/or aircraft. This can require incorporation of some form of a disconnect coupling along the tail rotor driveshaft. Such couplings can represent a potential weakness in the tail rotor power transmission system, which is typically subject to vibration and deflections during operation, that must be accommodated by the driveshaft during operation, and which must not result in damage to the coupling and accidental separation of the coupling during operation.

Such conventional rotorcraft powertrains have generally considered suitable for their intended purpose. However, there is still a need in the art for improved rotorcraft power transmission systems. The present disclosure provided a solution for this need.

SUMMARY OF THE INVENTION

A locking mechanism for a driveshaft disconnect coupling includes an input jaw member defining a rotation axis, an output jaw member connectable to the input jaw member for common rotation with the input jaw member, and a cartridge assembly. The cartridge assembly is fixed to the input jaw member, includes a pin defining a pin axis. The pin is movable along the pin axis between a radially inner position and a radially outer position, the pin being disengaged from the output jaw member when in the radially inner position such that the output jaw member can separate from the input jaw member, the pin being engaged to the output jaw member when in the radially outer position such that the output jaw member is locked to the input jaw member.

In certain embodiments, the cartridge assembly can be radially offset from the rotation axis. A fastener can fix the cartridge assembly to the input jaw member. The fastener can extend axially along the rotation axis such that the output jaw member can be disconnected from the input jaw member with the pin is in the radially outer position. The cartridge assembly can include a resilient member arranged to urge the pin toward the radially inner position. It is contemplated that the cartridge assembly can be a first cartridge assembly and a second cartridge assembly disposed on side of the rotation axis opposite the first cartridge assembly.

In accordance with certain embodiments, the pin can have a substantially planar locking surface. The locking surface of the pin can axially face the input jaw member. The pin can have a chamfered surface. The chamfered surface can be disposed on a side of the pin axially opposite the input jaw member. The input jaw member can include an input face portion having a cartridge seat, the cartridge assembly being fastened to the cartridge seat. A tail rotor shaft can be rotatably fixed and axially free relative the input jaw member, such as with a spline structure. An engagement spring can extend about the input jaw member. The engagement spring can be arranged to urge the input jaw member along the rotation axis.

It is also contemplated that, in accordance with certain embodiments, the input jaw member can have a peripheral rim extending about the rotation axis. The cartridge member can extend axially beyond the peripheral rim of the input jaw member. The output jaw member can have a peripheral rim. The peripheral rim of the output jaw member can axially overlay the peripheral rim of the input jaw member. The output jaw member can define an annular groove. The annular groove of the output jaw member can be disposed radially inward of the peripheral rim of the output jaw member. The output jaw member can have an engagement flange. The engagement flange can extend radially inward from the peripheral rim of the output jaw member.

A disconnect coupling includes a locking mechanism as described above, a seal retainer, and a seal member. The seal retainer extends about the input jaw member and is coupled to the input jaw member. The seal member extends about the output jaw member and is coupled to the output jaw member. An annular lubricant chamber is defined between the seal member and seal retainer. A cartridge assembly fastener can couple the seal member to the input jaw member.

A tail rotor drive system for a helicopter includes a locking mechanism as described above, a tail rotor drive shaft rotatably fixed and axially free relative to the input jaw member, and an engagement spring connected between the tail rotor drive shaft and the input jaw member. The cartridge assembly extends radially outward of the engagement spring such that a fastener coupling the cartridge assembly to the input jaw member is accessible when the input jaw member is connected to the output jaw member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
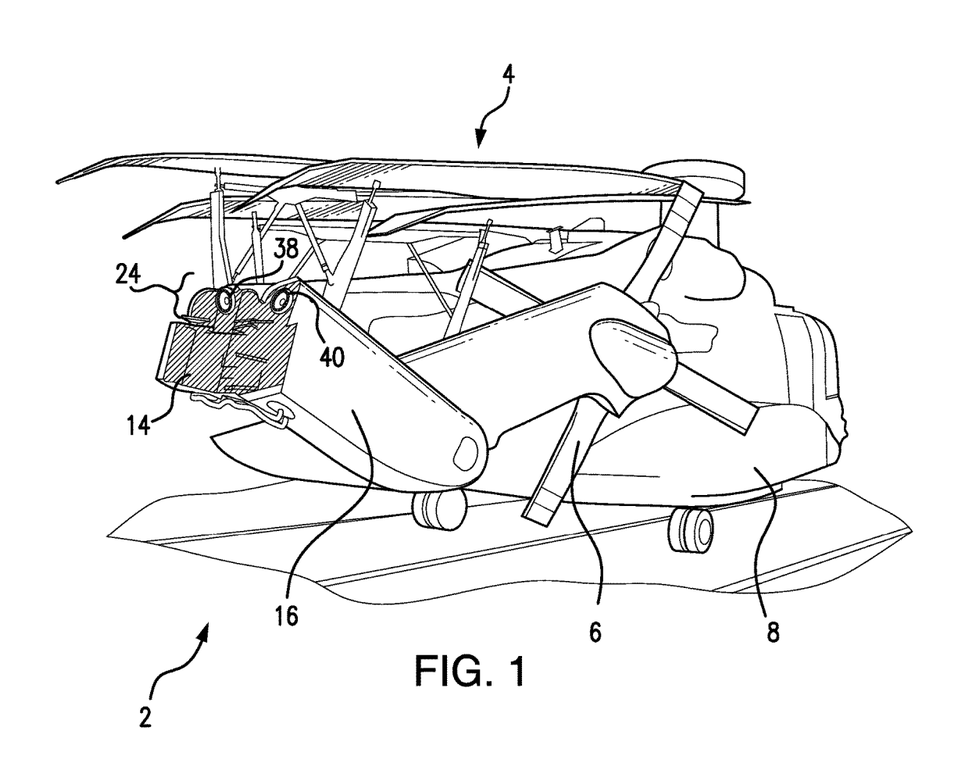
FIG. 1 is a schematic view of an exemplary embodiment of a rotorcraft, showing a helicopter with a tail rotor drive system disposed within a forward and aft sections of a folded tail cone.

Reference will now be made to the drawings wherein like reference numerals identify similar structural features or aspects of the subject disclosure. For purposes of explanation and illustration, and not limitation, a partial view of an exemplary embodiment of a disconnect coupling having a locking mechanism in accordance with the disclosure is shown in FIG. 1, and is designated generally by reference character 24. Other embodiments of disconnect couplings, locking mechanisms, and tail rotor drive systems in accordance with the disclosure, or aspects thereof, are provided in FIGS. 2-4, as will be described. The systems and methods described herein can be used for locking disconnect couplings to retain engagement and drive between input and output jaw members of disconnect couplings in helicopter tail rotor drive systems; however the present disclosure is not limited to helicopters or to aircraft in general.

Referring to FIG. 1, a rotorcraft 2, e.g., a helicopter, is shown. Rotorcraft 2 has a main rotor system 4 (shown folded for storage) carried by a fuselage 8 and a tail rotor assembly 6 disposed on a longitudinally extending tail cone 12 (shown in FIG. 2). Tail rotor assembly 6 is arranged to receive mechanical rotation from a tail rotor drive system 10 (shown in FIG. 2) through a tail rotor disconnect coupling 24. Disconnect coupling 24 includes an input jaw member 38 with face teeth 39 (shown in FIG. 2) that intermesh with face teeth 41 (shown in FIG. 2) of an output jaw member 40 to transfer mechanical rotation to a tail rotor assembly 6 carried by an aft section 16 (shown folded for storage) of a tail cone 12.

Figure 2:
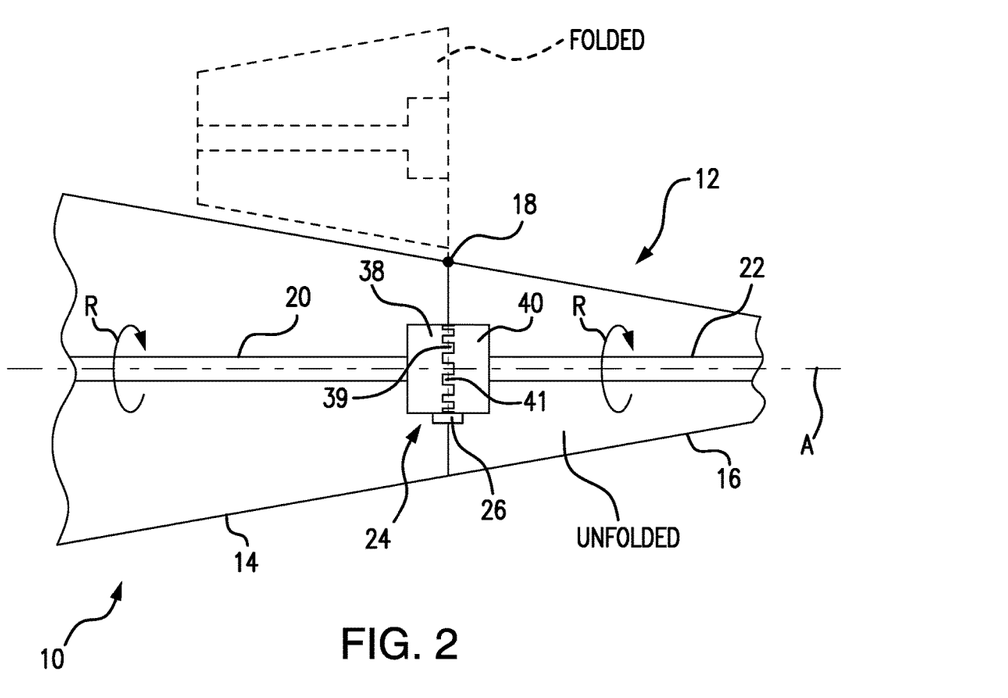
FIG. 2 is schematic view of the tail cone of FIG. 1, showing a disconnect coupling and disconnect coupling locking mechanism of the tail rotor drive system.

With reference to FIG. 2, tail rotor drive system 10 is shown. Disconnect coupling 24 includes a locking mechanism 24 for retaining input jaw member 38 and output jaw member 40 in intermeshed engagement while transferring mechanical rotation R therebetween. When intermeshed, face teeth 39 (shown schematically at a radially outer location) of input jaw member 38 apply torque to face teeth 41 (also shown schematically at a radially outer location) of output jaw member 40. As described herein, locking mechanism 24 is fixed relative to input jaw member 38. It is to be understood and appreciated that locking mechanism 24 may be fixed relative to output jaw member 40.

Tail rotor drive system 10 is rotatably supported within tail cone 12. Tail cone 12 includes a forward section 14, which is connected to fuselage 8 (shown in FIG. 1) and aft section 16. Aft section 16 joins forward section 14 at a generally vertical hinge 18 located at one side of tail cone 12 which permits pivotal movement of the aft section 16 to a folded position adjacent the side of the forward section 14, shown in broken outline in FIG. 2, thereby reducing the length of the tail cone 12 for storage purposes.

Tail rotor drive system 10 includes a tail rotor system (TRS) input drive shaft 20 coupled a TRS output drive shaft 22 by disconnect coupling 24 for driving the tail rotor assembly using mechanical rotation transmitted from a main gearbox (not shown for clarity reasons) through tail rotor drive system 10. Disconnect coupling 24 is located in relation to hinge 18 as to permit axial separation of TRS output drive shaft 22 from TRS input drive shaft 20 during pivotal movement of aft section 16 from forward section 14 of tail cone 12 about hinge 18. In the unfolded position, TRS input drive shaft 20 and TRS output drive shaft 22 couple to one another for common rotation about a rotation axis A. Disconnect coupling 24 includes a locking mechanism 24 for maintaining engagement and drive between TRS input drive shaft 20 and TRS output drive shaft 22 while in the unfolded position.

Figure 3:
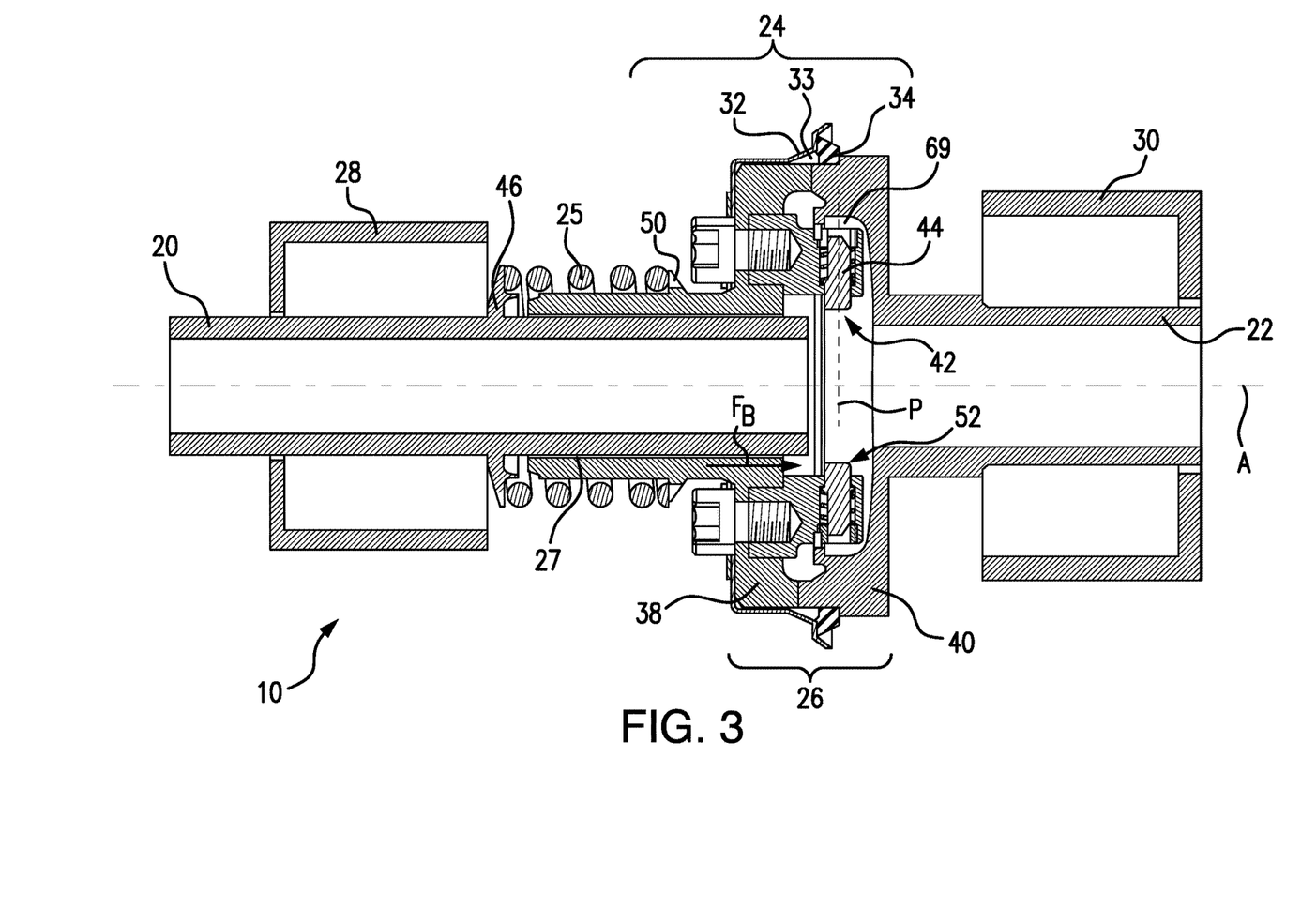
FIG. 3 is a cross-sectional side view of the tail rotor drive system of FIG. 1, showing the disconnect coupling locking mechanism coupling input and output shafts of the tail rotor drive system.

With reference to FIG. 3, tail rotor drive system 10 is shown. Tail rotor drive system 10 includes TRS input drive shaft 20, TRS output drive shaft 22, disconnect coupling 24, and an engagement spring 25. TRS input drive shaft 20 is rotatably supported by a forward bearing assembly 28, which is fixed relative to forward section 14 of tail cone 12 (shown in FIG. 1), and is rotatably fixed and axially free relative to disconnect coupling 24 by a splined interface 27. TRS output drive shaft 22 is rotatably supported by an aft bearing assembly 30, which is fixed relative to aft section 16 of tail cone 12 (shown in FIG. 1).

Engagement spring 25 is connected between TRS input drive shaft 20 and disconnect coupling 24. In the illustrated exemplary embodiment tail rotor drive system 10 is a helicopter tail rotor drive system configured to provide mechanical rotation to a tail rotor assembly. Engagement spring 25 is connected between TRS input drive shaft 20 and input jaw member 38 and is arranged to exert a biasing force $F_B$ against input jaw member 38 oriented along rotation axis A. When TRS input drive shaft 20 is coupled to TRS output drive shaft 22, biasing force $F_B$ urges input jaw member 38 against output jaw member 40. In the illustrated exemplary embodiment, engagement spring 25 is disposed radially outward of and about TRS input drive shaft 20 and input jaw member 38. A forward end of engagement spring 25 seats against a flange 46, which is fixed is relative to TRS input drive shaft 20. An aft end of engagement spring 25 seats against an input jaw member flange 50, which is fixed relative to input jaw member 38 and receives biasing force $F_B$.

Disconnect coupling 24 includes locking mechanism 24, a seal retainer 32, and a seal member 34. Seal member 34 and seal retainer 32 extend circumferentially about the exterior of disconnect coupling 24, define therebetween an annular lubricant chamber 33, and are configured and adapted to retain therein lubricant L, e.g., grease, which is pressurized by centrifugal force during rotation of tail rotor drive system 10 and driven radially outward thereby relative to rotation axis A. As will be appreciated by those of skill in the art, movement of the pressurized lubricant L (shown in FIG. 4) urges input jaw member 38 axially relative to output jaw member 40, potentially driving face teeth 39 of input jaw member 38 out of meshing engagement with face teeth 41 of output jaw member 40. Locking mechanism 24 limits axial displacement of input jaw member 38, retaining meshing engagement of face teeth 39 of input jaw member 38 with face teeth 41 of output jaw member 40. Seal member 34 and seal retainer 32 retain lubricant L between input jaw member 38 and output jaw member 40 within disconnect coupling 24 notwithstanding the pressurization of the lubricant L by rotation of disconnect coupling 24.

Locking mechanism 24 includes features defined by input jaw member 38 and output jaw member 40, and includes multiple cartridge assemblies 42 disposed radially about rotation axis A. Input jaw member 38 defines rotation axis A. Output jaw member 40 is connectable to input jaw member 38 for common rotation with input jaw member 38 about rotation axis A when input jaw member 38 is coupled to output jaw member 40, as shown in FIG. 2, and defines a locking flange 68 (shown in FIG. 4). An annular slot 69 is defined on a side of locking flange 68 opposite input jaw member 38 (when coupled) for receiving a radially outer end portion of pin 44, thereby axially locking input jaw member 38 to output jaw member 40. It is contemplated that locking flange 68 and annular slot 69 extend circumferentially about output jaw member 40, thereby allowing pin 44 to engage locking flange 68 without the need to rotationally register output jaw member 40 to input jaw member 38. In the illustrated exemplary embodiment cartridge assembly 42 is a first cartridge assembly, and locking mechanism 24 includes at least one second cartridge assembly 52, which distributes axial load carried by disconnect coupling 24. However, locking mechanism 24 can include more than two cartridge assemblies 42.

Figure 4:
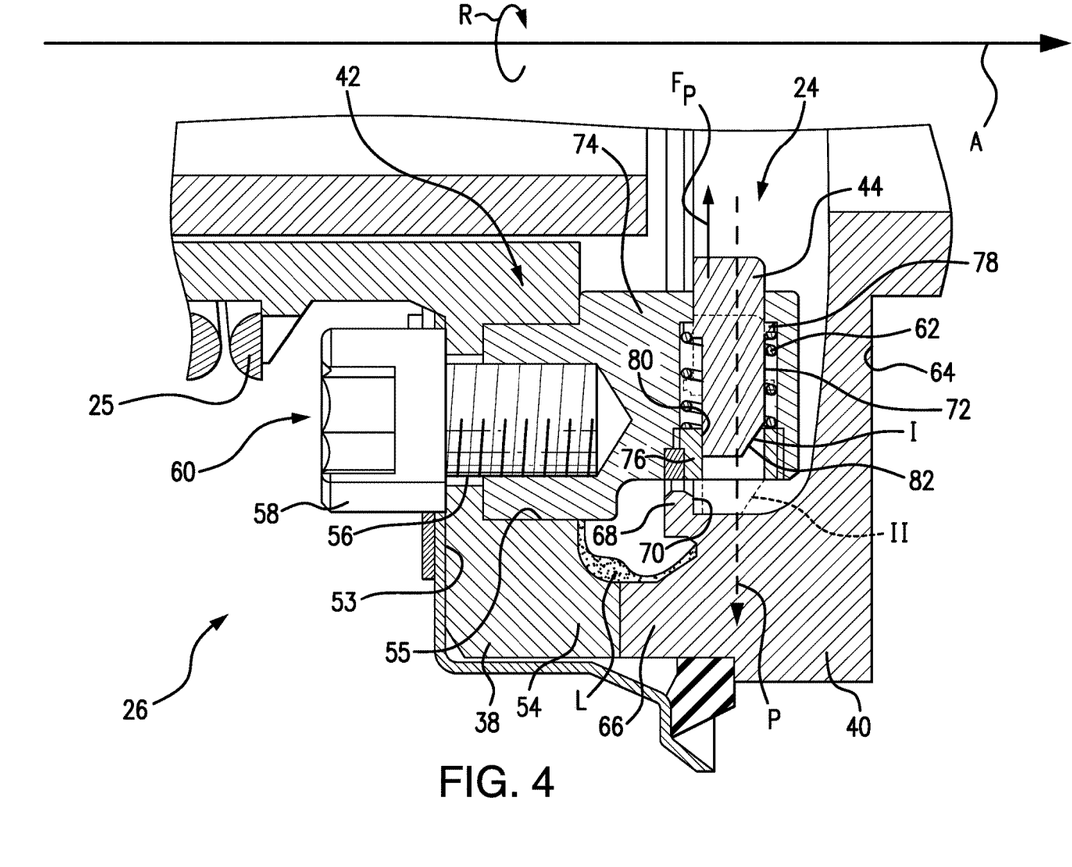
FIG. 4 is a partial cross-sectional side view of the tail rotor drive system of FIG. 1, showing a locking mechanism with a pin movable along a radially extending pin axis to lock and unlock the disconnect coupling of the tail rotor drive system.

With reference to FIG. 4, a single cartridge assembly 42 of locking mechanism 24 is shown. Cartridge assembly 42 is fixed to input jaw member 38, includes a pin 44, and defines a pin axis P. Pin 44 is movable along the pin axis P between a radially inner position I and a radially outer position II. When in radially inner position I, pin 44 is disposed radially inward of locking flange 68 in a disengaged arrangement and output jaw member 40 is axially unrestrained by locking mechanism 24 relative to input jaw member 38. This allows output jaw member 40 to separate from input jaw member 38. When in radially outer position II, a portion of pin 44 is disposed radially outward of locking flange 68 in an engaged arrangement, output jaw member 40 thereby being axially restrained by locking mechanism 24 relative to input jaw member 38. This locks output jaw member 40 to input jaw member 38.

Input jaw member 38 includes a radially extending face portion 53 and a peripheral rim 54. Face portion 53 and peripheral rim 54 extend about rotation axis A. Face portion 53 extends radially between peripheral rim 54 and rotation axis A. Peripheral rim 54 extends axially from face portion 53 along rotation axis A relative to face portion 53.

Face portion 53 of input jaw member 38 defines a cartridge seat 55 and a fastener aperture 56. A fastener 58 fixes cartridge assembly 42 to input jaw member 38. In the illustrated exemplary embodiment cartridge assembly 42 fixed within cartridge seat 55 by fastener 58. Fastener 58 extends through the axial thickness of face portion 53 and has a tool engagement feature 60 disposed on an axial side of face portion 53 opposite cartridge assembly 42.

Tool engagement feature 60 is disposed radially outward disconnect coupling structure, e.g., engagement spring 25, and is accessible when input jaw member 38 is locked to output jaw member 40, thereby allowing manual separation of input jaw member 38 from output jaw member 40. In particular, fastener 58 extends axially along rotation axis A such output jaw member 40 can be disconnected from input jaw member 38 when pin 44 is in radially outer position. The accessibility of tool engagement feature 60 allows manual uncoupling output jaw member 40 from input jaw member 38 in the event that pin 44 remains in radially outer position II, e.g., due to gravity, once rotation of disconnect coupling 24 ceases. The aft section can therefore be folded in the event that cartridge assembly 42 fails in the engaged arrangement.

Output jaw member 40 includes a face portion 64, a peripheral rim 66, and locking flange 68. Face portion 64 and peripheral rim 66 extend about rotation axis A. Face portion 64 extends radially between peripheral rim 66 and rotation axis A. Peripheral rim 66 extends axially from face portion 64 along rotation axis A relative to face portion 64 and mates with peripheral rim 54 of input jaw member 38 when input jaw member 38 is coupled to output jaw member 40 (as shown in FIG. 3).

Locking flange 68 is extends radially inward from face portion 64 outboard of cartridge assembly 42 and axially overlapping cartridge assembly 42. A pin locking surface 70 of locking flange 68, which is planar in the radial direction, overlaps pin 44 when pin 44 is in the radially outer position II of pin 44. A gap is defined therebetween, which closes in the event that output jaw member 40 begins to axially separate from input jaw member 38, pin 44 locking the input jaw member 38 to output jaw member 40 once pin 44 comes into contact with pin locking surface 70. As will be appreciated by those of skill in the art in view of the present disclosure, this provides locking engagement of input jaw member 38 and output jaw member 40 when pin 44 is in radially outer position II.

Cartridge assembly 42 is radially offset from rotation axis A. Cartridge assembly 42 includes a housing 74 defining a pin channel 72, a keeper 76, and resilient member 62. Pin channel 72 extends about pin axis P and seats pin 44. Keeper 76 has a pin aperture and is seated about the periphery of pin channel 72 on a radially outer side of housing 74. Resilient member 62 is retained within pin channel 72 by keeper 76.

Pin 44 has a pin flange 78. Resilient member 62 seats between pin flange 78 and keeper 76, and is arranged to urge pin 44 toward radially inner position I. In the illustrated exemplary embodiment, resilient member 62 is disposed between pin flange 78 and keeper 76 to exert a pin biasing force $F_P$ on pin 44. Pin biasing force $F_P$ is oriented radially inward along pin axis P, towards rotation axis A, and is sized such that centrifugal force associated with rotation of input jaw member 38 overcomes pin biasing force $F_P$. Overcoming pin biasing force $F_P$ causes pin 44 to move to radially output position II, pin 44 thereby radially overlapping locking flange 68. As will be appreciated by those of skill in the art in view of the present disclosure, radial overlap of pin 44 and locking flange 68 prevents separation of output jaw member 40 from input jaw member 38 as pin 44, fixed axially relative to input jaw member 38, is disposed on an axial side of locking flange 68 opposite input jaw member 38.

Pin 44 also has a planar locking surface 80 disposed on a side of pin 44 facing input jaw member 38 axially. As will be appreciated by those of skill in the art in view of the present disclosure, rotation R of input jaw member 38 and output jaw member 40 displaces lubricant L disposed between input jaw member 38 and output jaw member 40 to be forced radially outward by centrifugal force. As will be appreciated by those of skill in the art in view of the present disclosure, radially outward displacement of lubricant L applies urges output jaw member 40 to axially separate from input jaw member 38. Pin 44 limits the axial separation as axial displacement of output jaw member 40 relative to input jaw member 38 causes planar locking surface 80 of pin 44 to seat against pin locking surface 70 of locking flange 68, thereby ceasing further axial displacement of output jaw member 40 relative to input jaw member 38. As will be appreciated by those of skill in the art in view of the present disclosure, the planar contour of planar locking surface 80 reduces line loading resulting from the contact by distributing axial loading (contact pressure) over an area pin locking surface 80 contacting locking flange 68.

Axially opposite planar locking surface 80, pin 44 has a chamfered surface 82. Chamfered surface 82 allows output jaw member 40 to couple to input jaw member 38 in the event that resilient member 62 fails. In this respect, in the event that resilient member is unable to overcome the force of gravity on pin 44, and pin 44 is in radially outer position II, chamfered surface 82 will slide across the surface of pin flange 78 opposite pin locking surface 70 as output jaw member 40 is coupled to input jaw member 38. As will be appreciated by those of skill in the art in view of the present disclosure, chamfered surface 82 allows for coupling to output jaw member 40 to input jaw member 38 in the event that pin 44 is in engagement position II.

In embodiments described herein, locking mechanism 24 enables disconnect coupling 24 to be relatively lightweight relative to other alternative coupling arrangements. Locking mechanism 24 can prevent inadvertent diminished engagement of gear teeth of input jaw member 38 and gear teeth of output jaw member 40, reduced tooth wear, and efficient transfer of axial load that could otherwise result from centrifugally driven radial displacement of gear teeth lubricant between input jaw member 38 and output jaw member 40. In certain embodiments, a system loop is established between pin 44, and cartridge assembly 42, input jaw member 38 and output jaw member 40, and annular slot 69 defined by output jaw member 40. As axial forces from the centrifugal force of rotation cause input jaw member 38 to begin to axially displace relative to output jaw member 40, pin 44 (which has move to its radially outer position) engages locking flange 68 of opposed output jaw member 40. This prevents disengagement of seal member 34 and seal retainer 36 as well retains the intermeshed engagement of face teeth of input jaw member 38 and output jaw member 40.

The methods and systems of the present disclosure, as described above and shown in the drawings, provide for centrifugally driven automatically locking helicopter drive shaft disconnect couplings with superior properties including tolerance for relatively high torque. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A locking mechanism for a disconnect coupling of a rotary wing aircraft, comprising:
   an input jaw member defining a rotation axis;
   an output jaw member connectable to the input jaw member for common rotation with the input jaw member; and
   a cartridge assembly with a pin fixed to the input jaw member, wherein the pin is movable along a pin axis oriented perpendicular to the rotation axis, the pin being movable between a radially inner position and a radially outer position,
   the pin being disengaged from the output jaw member when in the radially inner position such that the output jaw member separates from the input jaw member, and
   the pin being engaged to the output jaw member when in the radially outer position such that the output jaw member is locked to the input jaw member.

2. The locking mechanism as recited in claim 1, wherein the cartridge assembly is radially offset from the rotation axis.

3. The locking mechanism as recited in claim 1, further comprising a fastener fixing the cartridge assembly to the input jaw member.

4. The locking mechanism as recited in claim 3, wherein the fastener extends axially along the rotation axis such that the output jaw member can be disconnected from the input jaw member when the pin is in the radially outer position.

5. The locking mechanism as recited in claim 1, wherein the cartridge assembly further comprises a resilient member arranged to urge the pin toward the radially inner position.

6. The locking mechanism as recited in claim 1, wherein the pin has a planar locking surface disposed on a side of the pin axially facing the input jaw member.

7. The locking mechanism as recited in claim 1, wherein the pin has a chamfered surface disposed on a side of the pin axially opposite the input jaw member.

8. The locking mechanism as recited in claim 1, wherein the cartridge assembly is a first cartridge assembly and further comprising a second cartridge assembly, the second cartridge assembly being fixed to the input jaw member on a side of the rotation axis opposite the first cartridge assembly.

9. The locking mechanism as recited in claim 1, wherein the input jaw member comprises an input face portion with a cartridge seat, the cartridge assembly being fastened to the cartridge seat.

10. The locking mechanism as recited in claim 1, further comprising a drive shaft coupled to the input jaw member by a splined interface.

11. The locking mechanism as recited in claim 1, further comprising an engagement spring extending about input jaw member and arranged to urge the input jaw member along the rotation axis.

12. The locking mechanism as recited in claim 1, wherein the input jaw member has a peripheral rim extending about the rotation axis.

13. The locking mechanism as recited in claim 12, wherein the pin is disposed on a side of the peripheral rim axially opposite the input jaw member.

14. The locking mechanism as recited in claim 12, wherein the cartridge assembly extends axially beyond the peripheral rim along the rotation axis.

15. The locking mechanism as recited in claim 1, wherein the output jaw member comprises a peripheral rim and a locking flange, the locking flange being disposed radially inward of the peripheral rim relative to the rotation axis when the output jaw member is connected to the input jaw member.

16. The locking mechanism as recited in claim 15, wherein the output jaw member defines an annular slot disposed radially between the peripheral rim and the locking flange of the output jaw member.

17. A disconnect coupling, comprising:
   a locking mechanism as recited in claim 1;
   a seal retainer extending about the input jaw member and coupled to the input jaw member; and
   a seal member extending about the output jaw member, wherein the seal retainer and the seal member define an annular lubricant chamber therebetween when input jaw member is coupled to the output jaw member, the lubricant chamber having according to axial distance between the input jaw member and output jaw member.

18. A disconnect coupling as recited in claim 17, further comprising a fastener fixing the cartridge assembly to the input jaw member, the fastener coupling the seal retainer to the input jaw member.

19. A tail rotor drive system for a helicopter, comprising:
   a locking mechanism as recited in claim 1;

a tail rotor drive shaft rotatably fixed to the input jaw member, the input jaw member being axially free relative to the tail rotor drive shaft; and an engagement spring connected between the tail rotor drive shaft and the input jaw member, wherein the cartridge assembly extends radially outward of the engagement spring such that a tool engagement feature of a fastener coupling the cartridge assembly to the input jaw member is accessible when the input jaw member of the disconnect coupling is connected to the output jaw member of the disconnect coupling.

20. A tail rotor drive system as recited in claim 19, further comprising a fastener fixing the cartridge assembly to the input jaw member, the fastener extending axially along the rotation axis.

* * * * *